United States Patent [19]
Itabashi et al.

[11] Patent Number: 5,899,587
[45] Date of Patent: May 4, 1999

[54] CAMERA HAVING A FLASH

[75] Inventors: Tomoaki Itabashi; Toshiyuki Katazawa, both of Saitama-ken, Japan

[73] Assignee: Asahi Kogaku Kogyo Kabushiki Kaisha, Tokyo, Japan

[21] Appl. No.: 09/010,930

[22] Filed: Jan. 22, 1998

[30] Foreign Application Priority Data

Jan. 23, 1997 [JP] Japan .................................... 9-010301

[51] Int. Cl.⁶ ................................................ G03B 15/03
[52] U.S. Cl. ............................................................. 396/177
[58] Field of Search .................................. 396/177, 178, 396/176, 535

[56] References Cited

U.S. PATENT DOCUMENTS

| | | | |
|---|---|---|---|
| 4,893,140 | 1/1990 | Yamamoto et al. ..................... | 396/177 |
| 4,910,542 | 3/1990 | Yamamoto et al. ..................... | 396/177 |
| 4,920,368 | 4/1990 | Arai et al. ............................. | 396/177 X |
| 5,055,866 | 10/1991 | Takebayashi ......................... | 396/177 X |
| 5,065,177 | 11/1991 | Yamamoto ............................. | 396/177 |
| 5,066,967 | 11/1991 | Yamamoto et al. ..................... | 396/177 |
| 5,134,433 | 7/1992 | Takami et al. .......................... | 396/177 |
| 5,142,465 | 8/1992 | Sato ..................................... | 396/177 |
| 5,245,374 | 9/1993 | Hosokawa et al. ..................... | 396/177 |
| 5,276,474 | 1/1994 | Dassero ................................. | 396/178 |
| 5,678,110 | 10/1997 | Koiwai ................................... | 396/535 |
| 5,729,768 | 3/1998 | Fields et al. ........................... | 396/178 X |

FOREIGN PATENT DOCUMENTS 8-62676  3/1996  Japan .

*Primary Examiner*—W. B. Perkey
*Attorney, Agent, or Firm*—Greenblum & Bernstein P.L.C.

[57] ABSTRACT

Disclosed is a camera which includes: a film chamber, formed in a camera body, for accommodating a film cassette therein; a film door for opening and closing an opening formed on the camera body through which the film cassette is inserted into the film chamber, the film door being positioned at an upper part of the camera; and a flash provided on the film door.

20 Claims, 18 Drawing Sheets

CAMERA HAVING A FLASH

BACKGROUND OF THE INVENTION

1. Field of the Invention

The present invention relates to a camera having a flash incorporated with the camera.

2. Description of the Related Art

Many of recent compact cameras using photosensitive film are very small in size for the purpose of improving its portability. Specifically, a camera which uses the recently-developed IX240 type film cassette (i.e., Advanced Photo System cassette) can be made smaller than a conventional compact camera using a 35 mm cassette because the IX240 type film cassette is smaller than the conventional 35 mm cassette.

The design of the Advanced Photo System cassette makes film loading an easy and simple procedure due to its drop-in loading. Namely, film loading is completed simply by inserting the film cassette into the film chamber of the camera and subsequently closing the film door of the camera. The film door is generally situated at the top or bottom of the camera body.

In a camera using the Advanced Photo System cassette provided with a built-in flash or a retractable flash, it is conventional to have the film door provided separate from the flash, i.e., the arrangement of the film door has no relationship with the arrangement of the flash.

SUMMARY OF THE INVENTION

The primary object of the present invention is to provide a compact camera that uses a film cassette (e.g., Advanced Photo System cassette) which makes drop-in loading possible, the compact camera being provided with a flash whose arrangement contributes greatly to the downsizing of the camera.

To achieve the object mentioned above, according to an aspect of the present invention, there is provided a camera which includes: a film chamber, formed in a camera body, for accommodating a film cassette therein; a film door for opening and closing an opening formed on the camera body through which the film cassette is inserted into the film chamber, the film door being positioned at an upper part of the camera; and a flash provided on the film door.

Preferably, the film door is pivoted about a shaft fixed to the camera body.

Preferably, the shaft is fixed to a front part of the camera body to extend in a widthwise direction of the camera body.

Preferably, the film cassette is of a drop-in loading type. Preferably, the film cassette is IX240 type film cassette.

Preferably, the flash includes a casing and a flashlight emitter supported by the casing, wherein the casing is movable relative to the film door so as to move the flashlight emitter in a direction apart from the film door.

Preferably, the casing is pivoted about a shaft fixed to the film door.

Preferably, the shaft is fixed to a rear part of the film door to extend in a widthwise direction of the camera lo body.

Preferably, the casing is movable between a retracted position where the flashlight emitter is located at a first position close to the film door and an operable position where the flashlight emitter is located at a second position above the first position, wherein the camera further includes a mechanism for preventing the film door from opening when the casing is in the operable position.

Preferably, the camera further includes a mechanism for preventing the casing from moving from the retracted position to the operable position when the film door is open.

According to another aspect of the present invention, there is provided a camera which includes: a film door for opening and closing an opening formed on a camera body through which a film cassette is inserted into a film chamber of the camera, the film door being positioned on an upper part of the camera; a pop-up type flash provided on the film door; and a mechanism for preventing the flash from popping-up when the film door is open.

Preferably, the camera further includes a second mechanism for preventing the film door from opening when the flash is in an operable position.

According to yet another aspect of the present invention, there is provided a camera which includes: a film chamber having an opening at an upper end of the film chamber, a film cassette being inserted into the film chamber through the opening; a film door for opening and closing the upper opening of the film chamber, the film door being positioned at an upper part of the camera; and a flash provided on the film door.

The present disclosure relates to subject matter contained in Japanese Patent Application No.9-10301 (filed on Jan. 23, 1997) which is expressly incorporated herein by reference in its entirety.

BRIEF DESCRIPTION OF THE DRAWINGS

The invention will be described below in detail with reference to the accompanying drawings in which similar members are indicated by similar reference numerals, and wherein.

DESCRIPTION OF THE PREFERRED EMBODIMENTS

Figure 1:
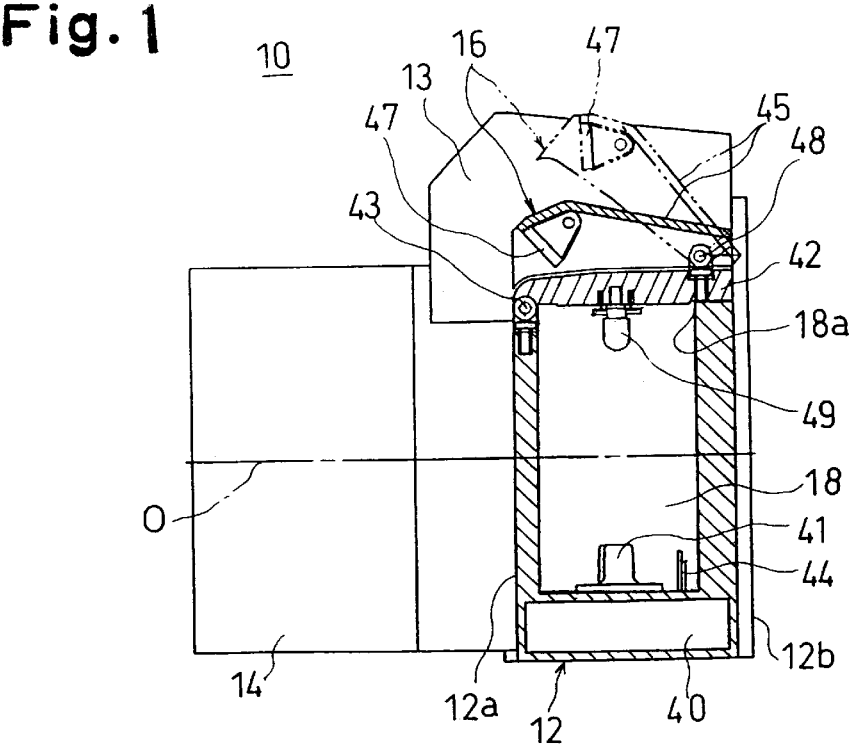
FIG. 1 is a side elevational view of a first embodiment of an SLR camera to which the present invention is applied, a part of which being shown as a cross sectional view taken along I—I line shown in FIG. 2.

FIGS. 1 through 14 show a first embodiment of an SLR camera to which the present invention is applied. The SLR camera 10 is a type of camera which employs an Advanced Photo System film cassette. The SLR camera 10 has a generally oblong box-shaped camera body 12. The camera body 12 is provided with a front wall 12a, a rear wall 12b, a right-side wall 12c and a left-side wall 12e. A detachable and interchangeable lens 14 is attached to the approximate center of the front wall 12a of the camera body 12.

The camera 10 is provided, at the top of the camera body 12 on one side thereof, with a shutter button 15 for releasing the shutter. The camera 10 is further provided, at the top of the camera body 12 on the other side thereof, with a retractable pop-up type flash 16. In each of FIGS. 1 and 2, the flash 16 positioned in its retracted position or its operable position (popped-up position) is indicated by a solid line or a two-dot chain line, respectively. The camera body 12 is provided at the top thereof with a bulged roof portion 13 for accommodating a conventional pentagonal prism (not shown) thereinside.

Figure 3:
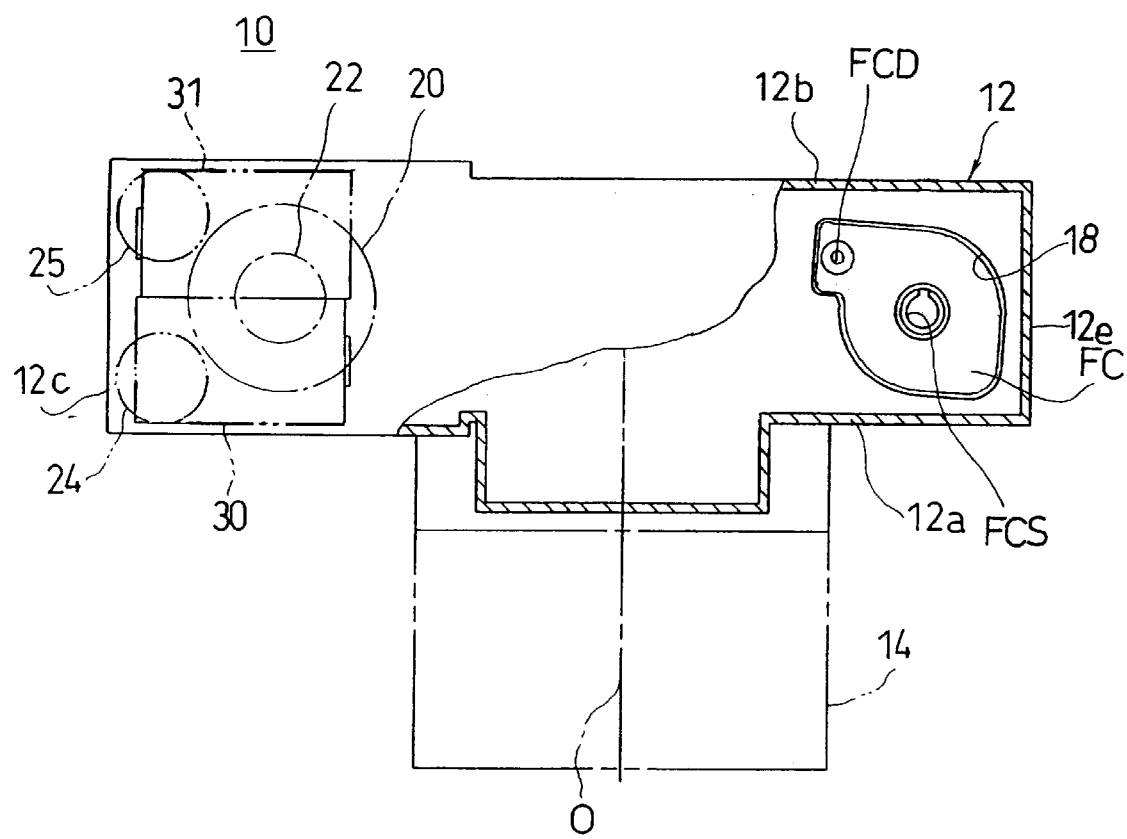
FIG. 3 is a cross sectional view of the camera shown in FIG. 2, taken along III—III line shown in FIG. 2.
Figure 4:
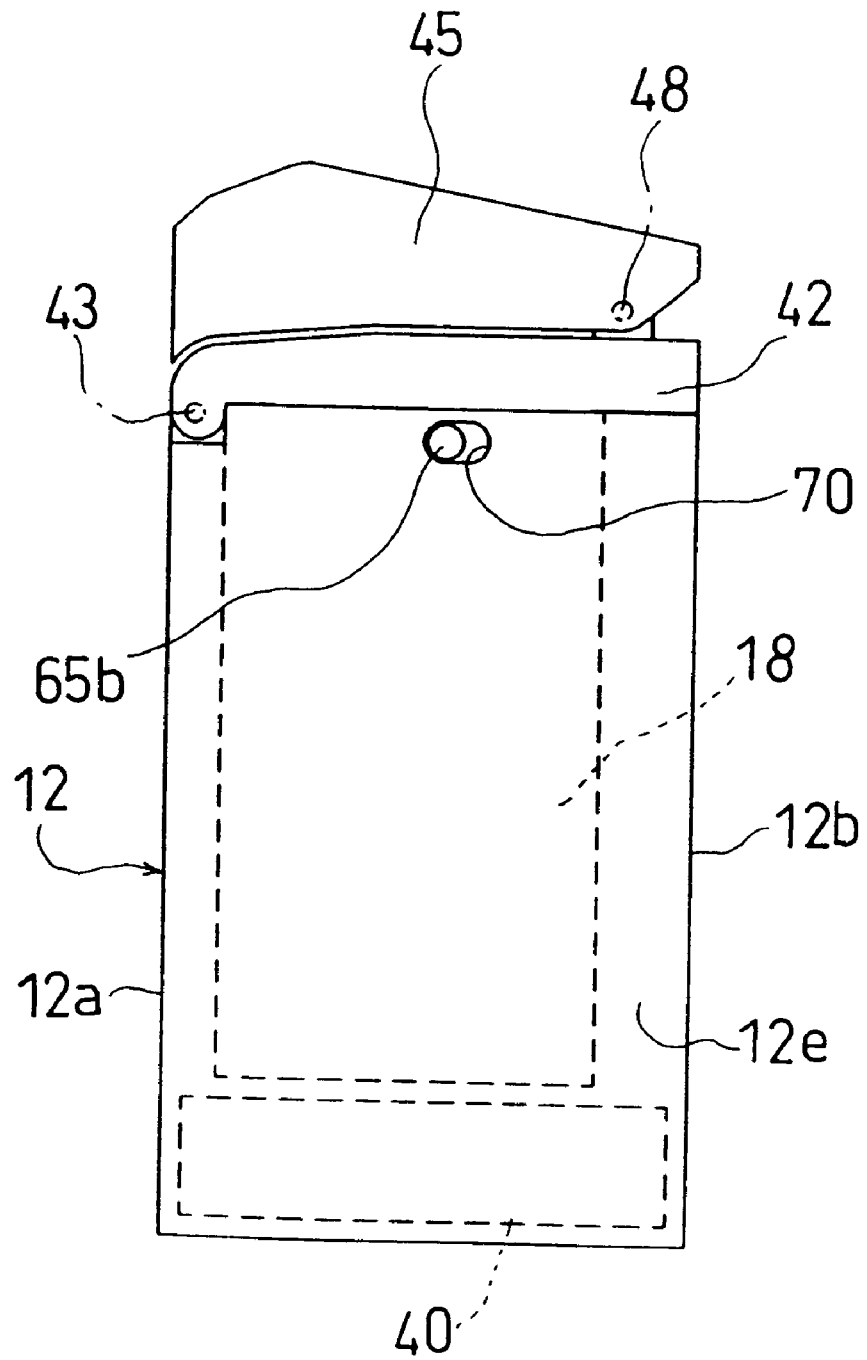
FIG. 4 is a side view of a fundamental portion of the camera shown in FIG. 1, showing the film door in its closed position while a retractable flash is in its retracted position.

As shown in FIG. 3, the camera 10 is provided with a film chamber 18 and a spool chamber 20 on respective sides inside the camera body 12. In the film chamber 18 an IX240 type film cassette (Advanced Photo System film cassette) FC is accommodated. Roll film in the film cassette FC is wound by a film take-up spool 22 positioned in the spool chamber 20.

In the camera body 12, two cylindrical condensers 24 and 25 (see FIG. 3) are arranged between the right-side wall 12c and the spool chamber 20 such that the two cylindrical condensers 24 and 25 each extend vertically with one cylindrical condenser 24 being positioned in front of the other cylindrical condenser 25. Each of the cylindrical condensers 24 and 25 is arranged so as to extend its metal legs (not shown) upwards, so that the legs of one condenser 24 are connected with the legs with the other condenser 25 on the upper side of the two condensers 24 and 25 to electrically connect the condenser 24 with the condenser 25 in parallel. Condensers 24 and 25 are electrically connected to a xenon flashlight tube 16a provided in the flash 16.

Figure 2:
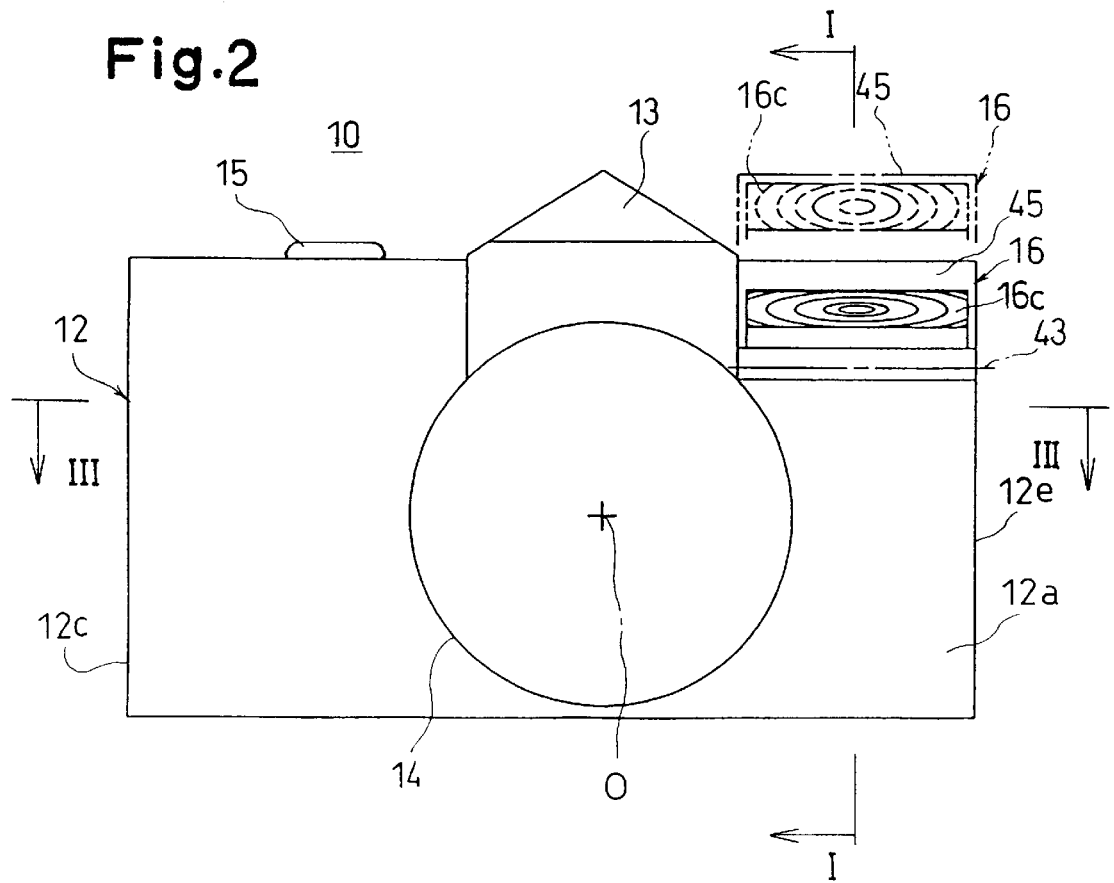
FIG. 2 is a front elevational view of the SLR camera shown in FIG. 1.

In the camera body 12 two cylindrical batteries 30 and 31 are accommodated above the two condensers 24 and 25 and the spool chamber 20 to be arranged side by side with the lengthwise direction of each battery extending parallel to the widthwise direction of the camera body 12 (horizontal direction as viewed in FIG. 2 or 3). The batteries 30 and 31 can be taken out of the camera body 12 through an opening (not shown) formed on the right-side wall 12c. A battery door (not shown) for opening and closing the opening is provided on the right-side wall 12c. The batteries 30 and 31 are the same type. In this particular embodiment of the camera 10 each battery is a three-volt lithium type battery "CR2". However, the batteries 30 and 31 may be replaced by similar type of batteries.

The camera 10 is provided, in the camera body 12 under the film chamber 18, with a film cartridge drive mechanism 40 including a gear train (not shown). The camera 10 is provided at the bottom of the film chamber 18 with a rotatable projection 41 and a rotatable key 44 each extending upwards from the bottom of the film chamber 18. The rotatable projection 41 is engaged with a corresponding end of a spool FCS (see FIG. 3) of the film cassette FC while the rotatable key 44 is engaged with a corresponding end of a light-interceptive door FCD (see FIG. 3) of the film cassette FC when the film cassette FC is inserted completely into the film chamber 18. With the film cassette FC in the film chamber 18, the film cartridge drive 40 drives the rotating projection 41 and the key 44 at an appropriate timing to carry out the operation of opening or closing the light-interceptive door FCD of the film cassette FC, the operation of rotating the spool FCS of the film cassette FC in forward or reverse direction, and some other operations.

Figure 6:
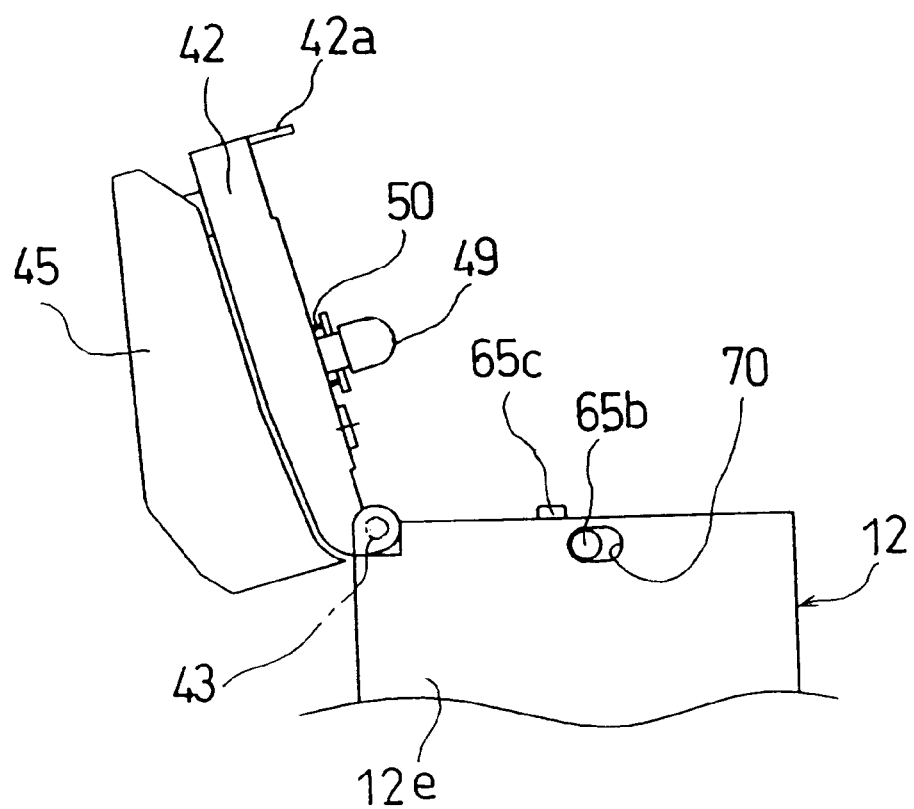
FIG. 6 is a side view of a part of the fundamental portion shown in FIG. 4, showing the film door in a widely opened state while the retractable flash is in its retracted position.

The camera body 12 is provided at the top of the film chamber 18 with an insertion opening 18a through which the film cassette FC is inserted into the film chamber 18 in a predetermined direction. The camera body 12 is further provided with a substantially square-shaped film door 42 for opening and closing the insertion opening 18a. The front end of the film door 42 is pivoted about a shaft 43 which is fixed to an upper end portion of the front wall 12a to extend in the widthwise direction of the camera body 12. Accordingly, the film door 42 can be opened by being rotated about the shaft 43 in a counterclockwise direction as viewed in FIG. 1. FIG. 6 shows a state where the film door 42 is widely open.

The film door 42 is provided at the bottom (inner face) thereof with a second rotatable projection 49 which is coaxial to the rotatable projection 41 in the state where the film door 42 is closed. The second rotatable projection 49 is engaged with a corresponding end of the spool FCS of the film cassette FC when the film door 42 is closed with the film cassette FC being accommodated in the film chamber 18, so as to support the corresponding end of the spool FCS. There is provided a compression spring 50 (see FIG. 5) positioned between the inner face of the film door 42 and the second rotatable projection 49, so that the second rotatable projection 49 is continuously biased in a direction contrary to the film door 42 by the compression spring 50. The second rotatable projection 49 can retreat a little, moving towards the film door 42 against the biasing force of the compression spring 50.

The main feature of the present invention lies within the arrangement in which the retractable flash 16 is mounted on the film door 42. The flash 16 is provided with a casing (flash casing) 45 which is rotatable relative to the film door 42 and a flashlight emitting portion 47 fixed at the front of the casing 45. The flashlight emitting portion 47 is provided with the aforementioned xenon flashlight tube 16a, a reflector 16b and a Fresnel lens 16c fixed in front of the xenon flashlight tube 16a.

Figure 5:
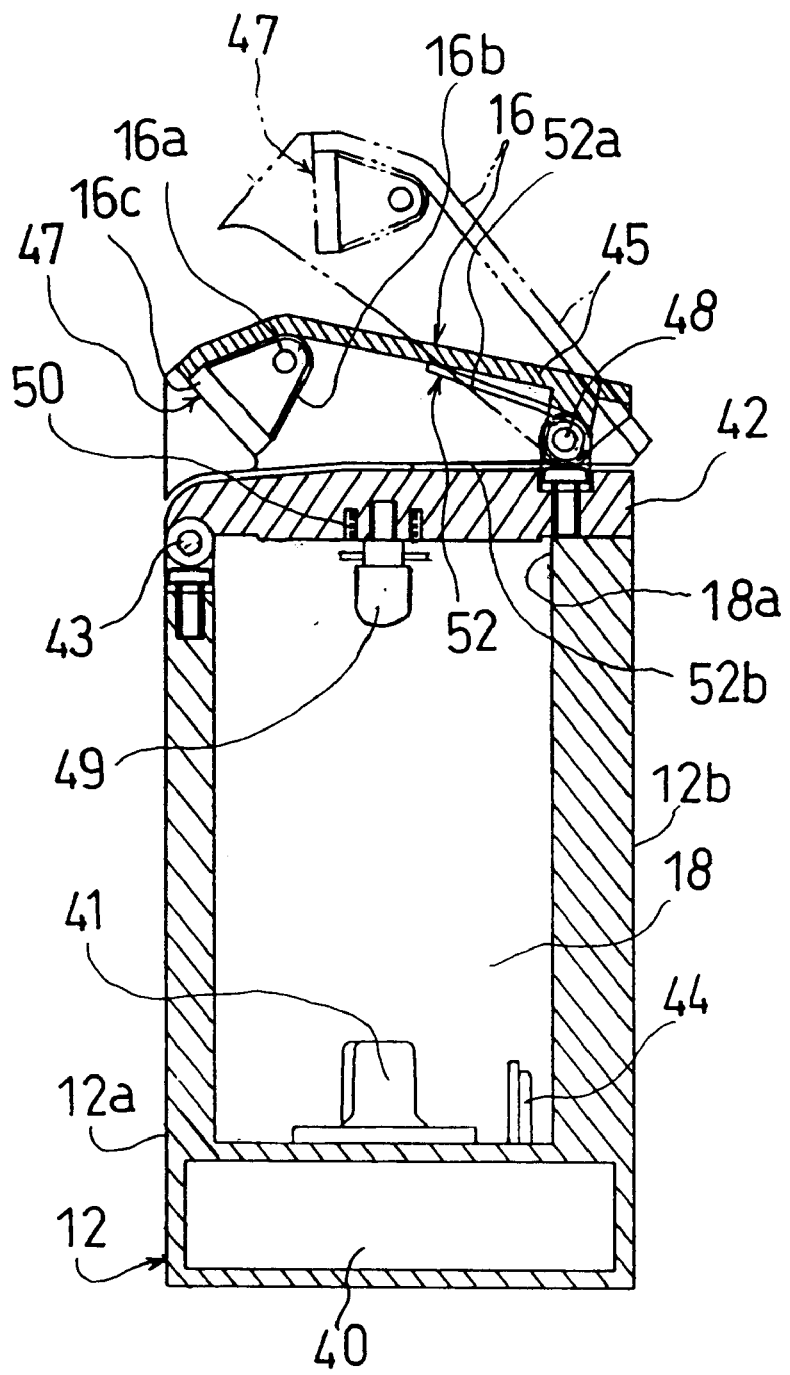
FIG. 5 is a cross sectional view of the fundamental portion shown in FIG. 4.

The dimensions of the casing 45 are such that it precisely fits and covers the upper surface of the film door 42 when the casing 45 is in its retracted position shown by solid lines in FIG. 1 or 5, so that the upper surface of the casing 45 forms a part (right part as viewed in FIG. 2) of the upper exterior face of the camera 10. The rear end of the casing 45 is pivoted about a shaft 48 which is fixed to a rear end portion of the film door 42 to extend in the widthwise direction of the camera body 12, namely, in parallel to the shaft 43. Accordingly, the casing 45 can rotate about the shaft 48 in a clockwise direction as viewed in FIG. 1, i.e., in a direction to shift the front of the casing 45 apart from an optical axis 0 of the lens 14, to set the flash 16 in its operable position. As can be seen from FIG. 1 or 5, the shafts 43 and 48 are positioned immediately in front of and behind the insertion opening 18a, respectively.

As shown in FIG. 5 a torsion coil spring 52 is fitted on the shaft 48. One end 52a and the other end 52b of the spring 52 are each formed straight so that the end 52a contacts the inner surface of the casing 45 while the other end 52b contacts the upper surface of the film door 42. The casing 45 is continuously biased by the torsion coil spring 52 in the clockwise direction as viewed in FIG. 1 or 5 towards the operable position (popped-up position) of the casing 45.

Figure 7:
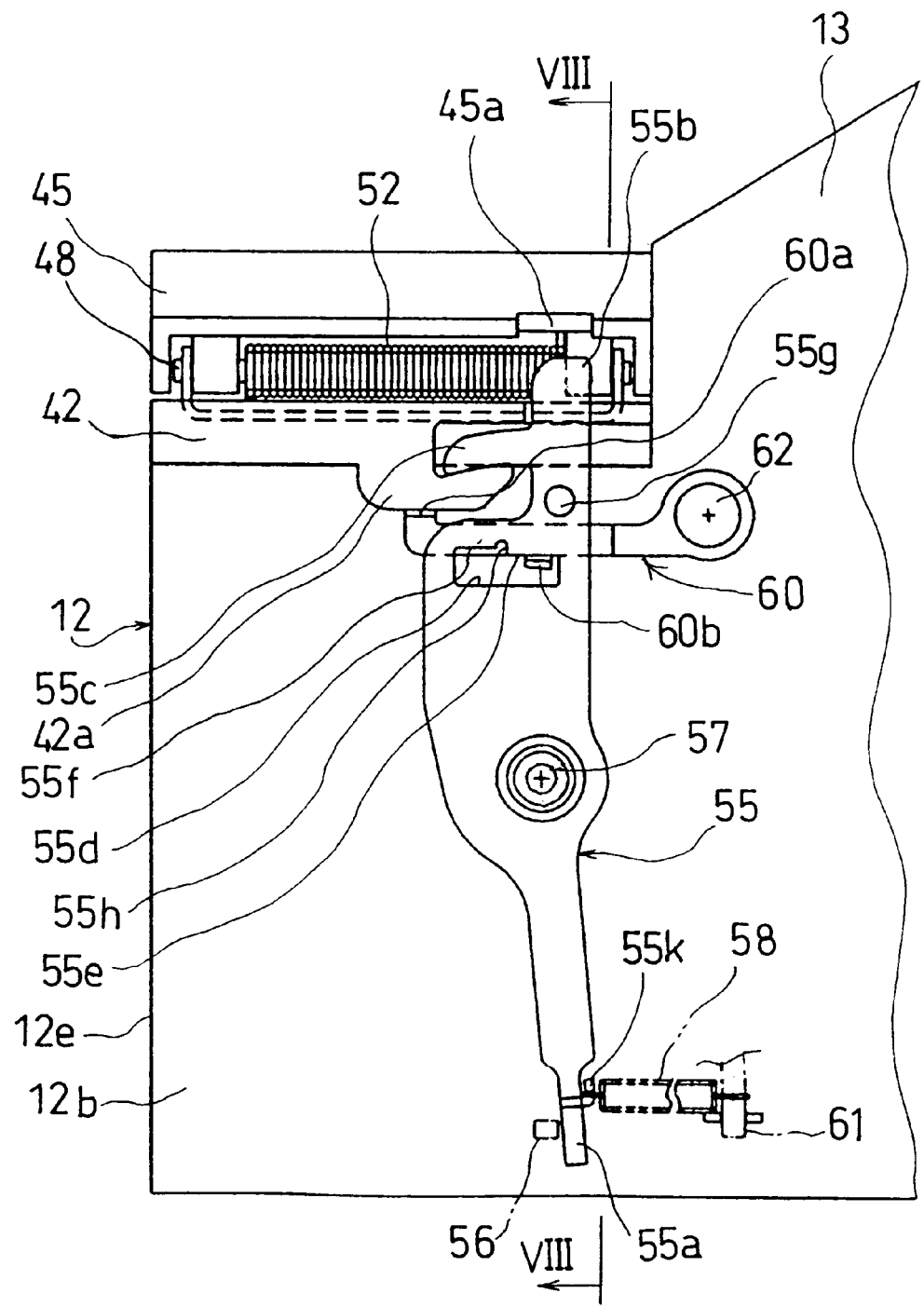
FIG. 7 is a rear view of a fundamental portion of the camera shown in FIG. 1, showing the film door in its closed position while the retractable flash is in its retracted position.
Figure 8:
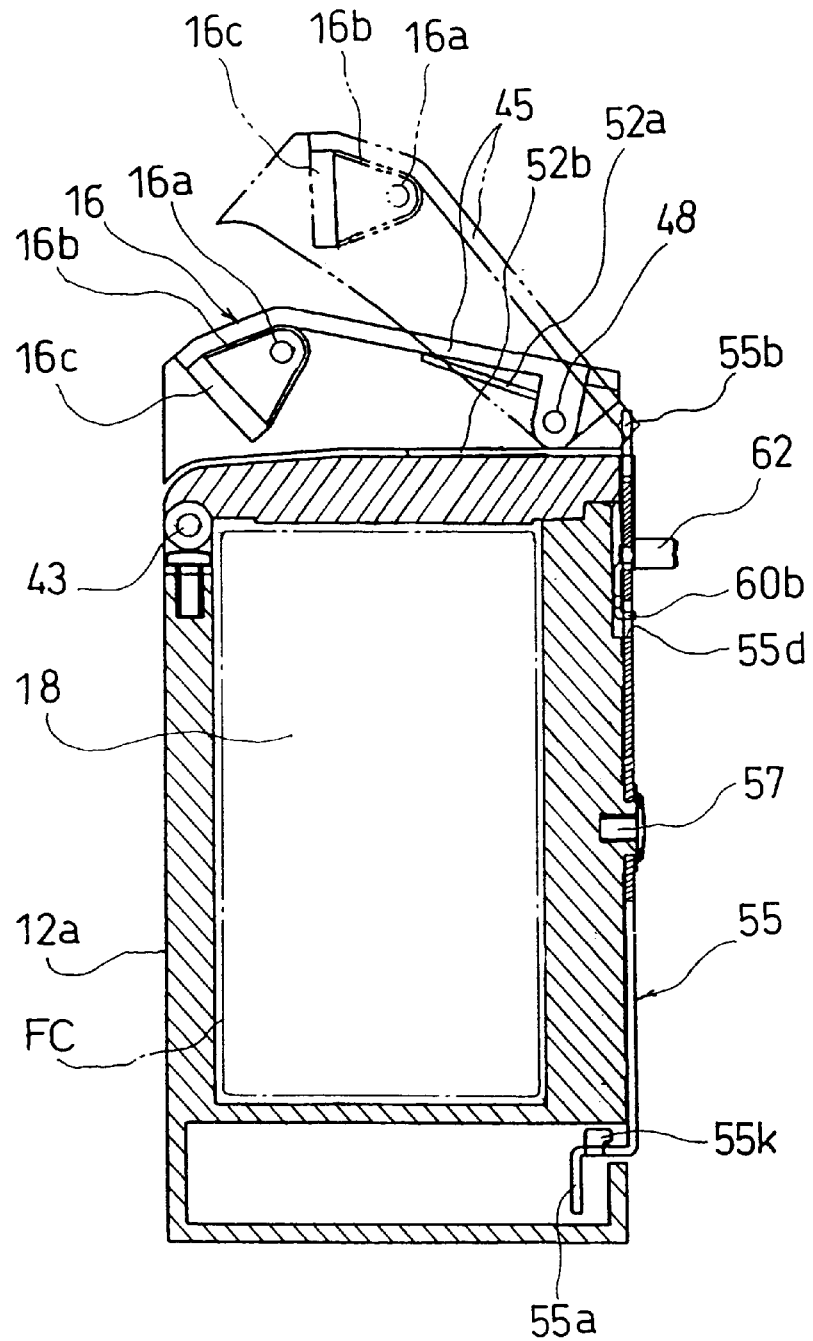
FIG. 8 is a cross sectional view, taken along VIII—VIII line shown in FIG. 7.

The film door 42 is provided at the rear end of the inner surface thereof with a film door claw 42a (see FIG. 6 or 7). The film door claw 42a is engaged with an engaging claw 55c of a first lever (film door locking lever) 55 supported on the camera body 12 when the film door is closed.

The camera 10 is provided with a first mechanism for locking the film door 42 (i.e., for preventing the film door 42 from opening) when the flash 16 is in its operable position. The camera 10 is further provided with a second mechanism for holding the flash 16 (casing 45) in its retracted position (i.e., for preventing the casing 45 from moving its retracted position to its operable position) when the film door 42 is open. The first and second mechanism will be hereinafter discussed.

The first mechanism and peripheral members thereof will be first discussed. As shown in FIG. 7 the camera 10 is provided on the rear surface of the rear wall 12 with the aforementioned first lever 55 which substantially extends vertically along the rear surface of the rear wall 12. The first lever 55 is pivoted about a pivotal screw 57 secured to the rear wall 12, so that the first lever 55 can rotate about the pivotal screw 57 in clockwise and counterclockwise directions by a predetermined angle of rotation. The engaging claw 55c of the first lever 55 can be engaged with or disengaged from the film door claw 42a. The engaging claw 55c can be engaged to hold the film door 42 in its closed position when the film door 42 is closed and also lock the film door 42 when the flash 16 is not in its retracted position.

A lower end 55a of the first lever 55 is bent inwardly to be positioned inside the film cartridge drive mechanism 40. The first lever 55 is provided in the vicinity of the lower end 55a with a hook 55k on which one end of a coil spring 58 provided in the camera body 12 is hooked. The other end of the coil spring 58 is hooked on a projection 61 which is fixed to the camera body 12 thereinside. The coil spring 58 is expanded between the hook 55k and the projection 61 and therefore continuously draws the lower end 55a in a direction towards the projection 61, i.e., towards the right side of the camera 10 as viewed in FIG. 7, so that the first lever 55 is continuously biased to rotate about the pivotal screw 57 in a counterclockwise direction as viewed in FIG. 7.

There is provided a relaying member 56 in the camera body 12 which is positioned in the vicinity of the lower end 55a of the first lever 55. The relaying member 56 transmits the movement of the lower end 55a to an interlocking mechanism (not shown) provided in the film cartridge drive mechanism 40. Namely, when the first lever 55 rotates in the clockwise direction as viewed in FIG. 7, the lower end 55a firstly contacts the relaying member 56 and subsequently moves the same from the position (first position) thereof shown in FIG. 7 to another position (second position) shown in FIG. 10. This movement of the relaying member 56 causes to move the aforementioned interlocking mechanism in the film cartridge drive mechanism 40, which makes the film cartridge drive mechanism 40 rotate the rotatable key 44 in a predetermined rotational direction to thereby rotate the light-interceptive door FCD of the film cassette FC to shut the same. The relaying member 56 is continuously biased by a spring or the like (not shown) in the direction from the second position shown in FIG. 10 towards the first position shown in FIG. 7.

The first lever 55 is provided at the uppermost end thereof with a protrusion 55b, which extends upwardly, up to the position which is a little higher than that of the shaft 48, as can be seen from FIG. 7. The casing 45 is provided on a rear end thereof with a recess 45a with which the protrusion 55b of the first lever 55 can be engaged. The protrusion 55b is engaged with the recess 45a when the flash 16 (the casing 45) is located in its operable position (see FIG. 9). The protrusion 55b is disengaged from the recess 45a when the flash 16 is in its retracted position (see FIG. 7).

The first lever 55 is provided below the protrusion 55b thereof with the aforementioned engaging claw 55c which extends leftwards as viewed in FIG. 7 to be engageable with the film door claw 42a. The first lever 55 is further provided below the engaging claw 55c with a horizontally elongated slot 55d. The upper edge of the slot 55d is comprised of an upper left edge 55f and an upper right edge 55e as can be clearly seen in FIG. 10. The upper left edge 55f is formed to be slightly closer to the upper end of the first lever 55 than the upper right edge 55e to form a stepped portion 55h (see FIG. 7) between the upper left edge 55f and the upper right edge 55e.

The first lever 55 is provided between the slot 55d and the protrusion 55b with a projection 55g which extends rearwardly so that it can be manually operated with fingers or the like of the user of the camera 10. Accordingly, the first lever 55 can be manually rotated in the clockwise or counterclockwise direction by manually shifting the projection 55g right or left, respectively.

There is provided on the rear surface of the rear wall 12b a second lever 60 which substantially extends horizontally to intersect the first lever 55. One end (right end as viewed in FIG. 7) of the second lever 60 is pivoted about a pivotal screw 62 secured to the rear wall 12b. The second lever 60 is continuously biased to rotate in a clockwise direction as viewed in FIG. 7 by a torsion coil spring (not shown). The other end of the second lever 60 extends up to approximately the center of the lower edge of the film door claw 42a and is provided with an engaging portion 60a which is engageable with the lower edge of the film door claw 42a. The engaging portion 60a contacts the lower edge of the film door claw 42a when the film door 42 is closed. The second lever 60 is further provided at the lower edge thereof with an extension 60b which extends rearwardly through the slot 55d of the first lever 55. The first lever 55, the coil spring 58, the second lever 60, the film door claw 42a, the recess 45a, etc., together constitute the aforementioned first mechanism for locking the film door 42 when the flash 16 is in its operable position.

The operation of the first mechanism will be hereinafter discussed. In the state shown in FIG. 7 where the flash 16 is retracted while the film door 42 is closed, the film door claw 42a of the film door 42 is engaged with the engaging claw 55c of the first lever 55. At the same time, the engaging portion 60a of the second lever 60 contacts the lower edge of the film door claw 42a while the lower end 55a of the first lever 55 is slightly apart from the relaying member 56.

Figure 11:
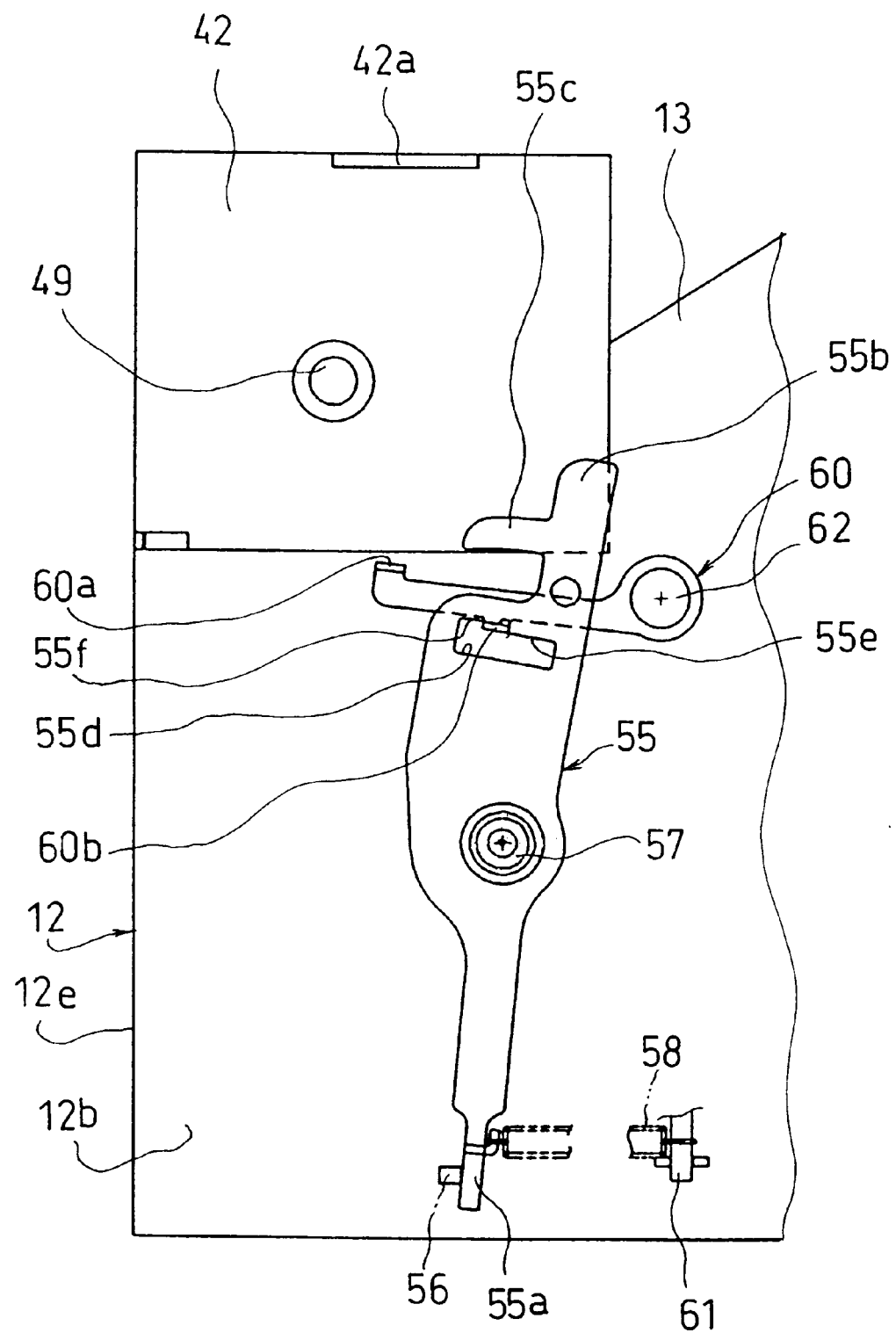
FIG. 11 is a rear view of the fundamental portion shown in FIG. 7, showing the film door in a widely opened state.

When the first lever 55 is rotated in the clockwise direction as viewed in FIG. 7 by manually shifting the projection 55g in the same direction, the engaging claw 55c shifts to the right as viewed in FIG. 7 to be thereby disengaged from the film door claw 42a. At the same time the lower end 55a firstly contacts the relaying member 56 and subsequently moves the same to the left as viewed in FIG. 7, i.e., from the aforementioned first position to the aforementioned second position (see FIG. 10). Due to this movement of the relaying member 56 the light-interceptive door FCD of the film cassette FC is shut and at the same time the engaging portion 60a of the second lever 60 slightly lifts the film door claw 42a by the biasing force of the aforementioned torsion coil spring (not shown), provided for biasing the second lever 60 to rotate in the clockwise direction as viewed in FIG. 7, to thereby open the film door 42 slightly. After the film door 42 has been slightly opened in such a way, the film door 42 can be widely opened by further opening the film door 42 manually. FIG. 11 shows such a state whereby the film door 42 is widely open. In the state shown in FIG. 11 where the film door 42 is open, the second lever 60 stays at the position after having slightly rotated in the clockwise direction from its initial position shown in FIG. 7, 9 or 10, so that the extension 60b abuts against the upper left edge 55f of the slot 55d of the first lever 55, which prevents the second lever 60 from further rotating in the clockwise direction as viewed in FIG. 11. At the same time the extension 60b is engaged with the stepped portion 55h of the slot 55d, which maintains the first lever 55 at the position thereof shown in FIG. 11.

In the state shown in FIG. 11, when the user desires to close the film door 42, he or she has only to close the film door 42 manually. When the film door 42 is closed in such a way, the film door claw 42a depresses the engaging portion 60a to be engaged therewith, so that the extension 60b is disengaged from the stepped portion 55h of the slot 55b. Due to this disengagement of the extension 60b from the stepped portion 55h, the first lever 55 rotates from its position shown in FIG. 11 in the counterclockwise direction, so that the film door claw 42a is engaged with the engaging claw 55c of the first lever 55 to thereby lock the film door 42. At the same time the lower end 55a of the first lever 55 is disengaged from the relaying member 56, so that the rotatable key 44 rotates in a direction to open the light interceptive door FCD of the film cassette FC, thereby the camera 10 returns to the state shown in FIG. 7.

Figure 9:
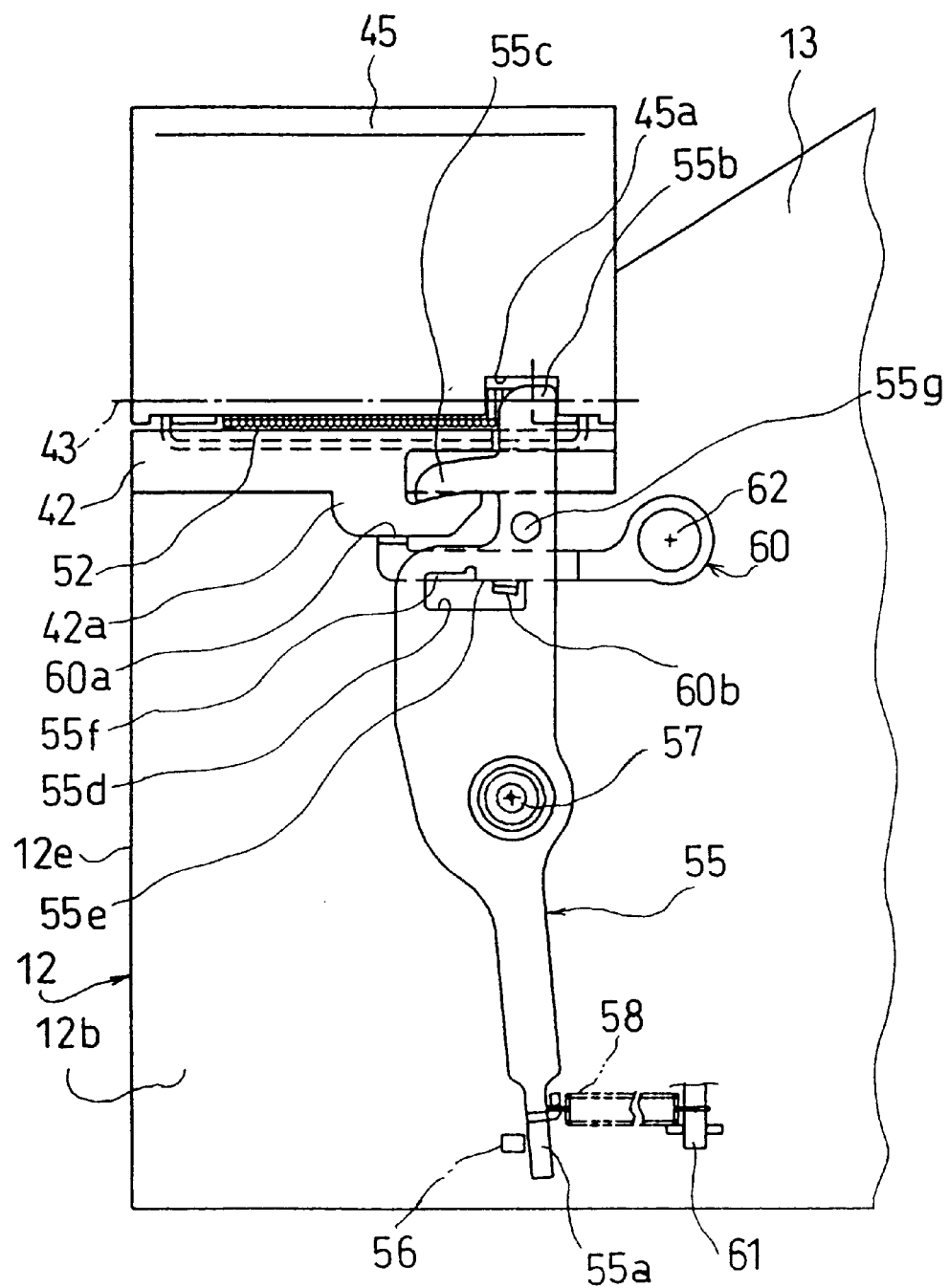
FIG. 9 is a rear view of the fundamental portion shown in FIG. 7, showing the film door in its closed position while the retractable flash is in its operable position.
Figure 10:
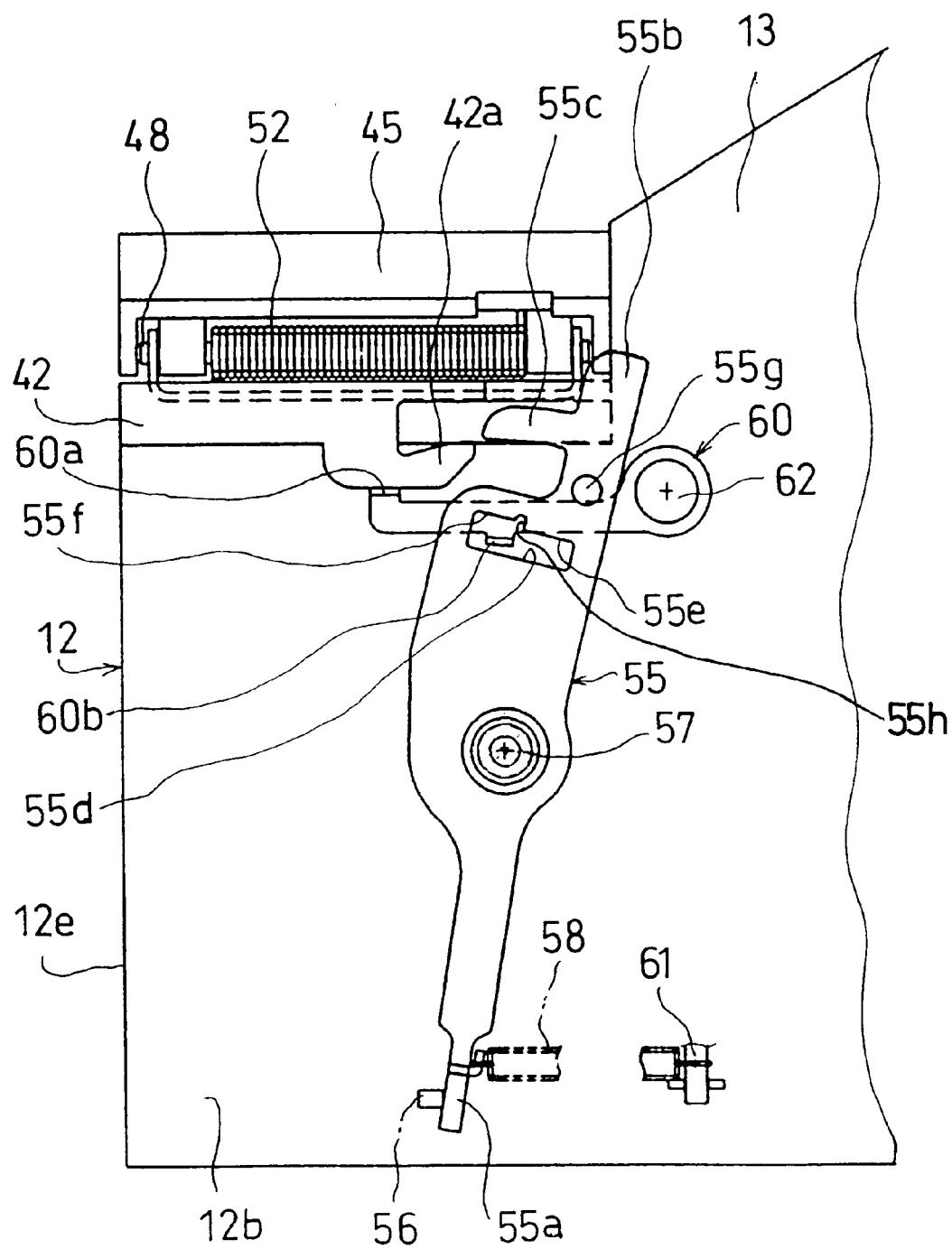
FIG. 10 is a rear view of the fundamental portion shown in FIG. 7, showing the film door locking lever in its unlocked position.

As can be appreciated from the foregoing, although the film door 42 can be opened when the flash 16 is in its retracted position, the film door 42 cannot be opened when the flash 16 is in its operable position since the protrusion 55b is engaged with the recess 45a when the flash 16 is in its operable position (see FIG. 9). This is because the first lever 55 cannot rotate in the same direction when the flash 16 is in its operable position because the protrusion 55b is positioned in the recess 45 as shown in FIG. 9 (i.e., the protrusion 55b is engaged with the recess 45). However the first lever 55 can rotate in a clockwise direction as viewed in FIG. 7 when the flash 16 is in its retracted position because the protrusion 55b is located below the recess 45 (i.e., the protrusion 55b is not engaged with the recess 459. If the film door 42 could be opened when the flash 16 is in its operable position, the chances of damaging the flash 16 would increase because the flash 16 would be in a state as if hanging from the film door 42. However, such a problem will never occur in the present embodiment of the camera 10 because the film door 42 cannot be opened when the flash 16 is in its operable position.

The second mechanism (for holding the flash 16 in its retracted position when the film door 42 is open) and peripheral members thereof will be hereinafter discussed.

Figure 12:
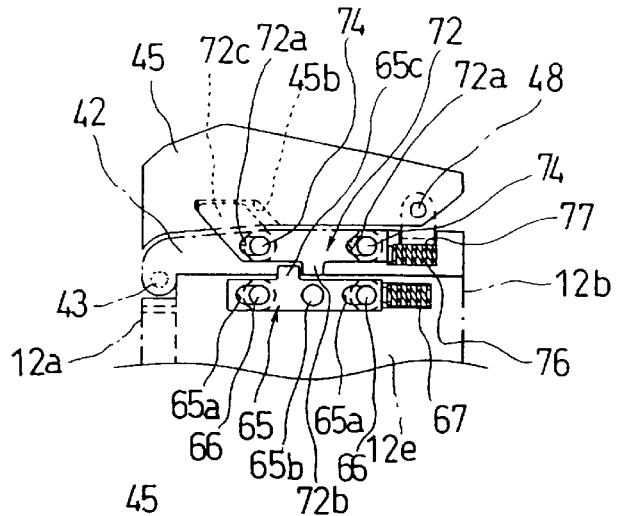
FIG. 12 is a side view of a mechanism for holding the retractable flash in its retracted position in the first embodiment of the camera, showing the film door in its closed position while the retractable flash is in its retracted position.
Figure 13:
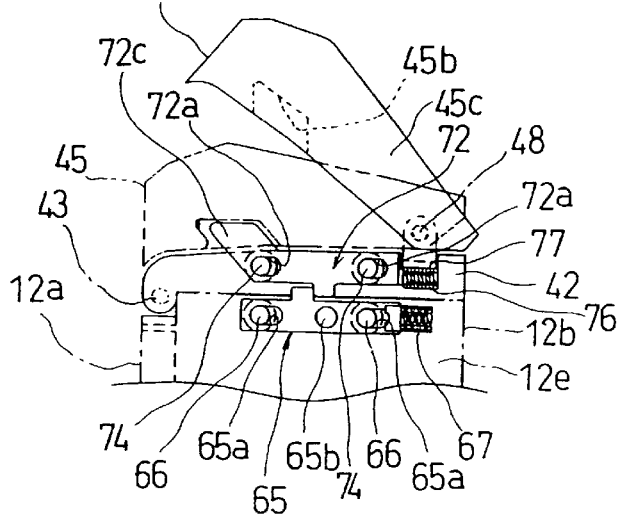
FIG. 13 is a side view of the holding mechanism in a different state from that shown in FIG. 12, showing the film door in its closed position while the retractable flash is in its operable position.
Figure 14:
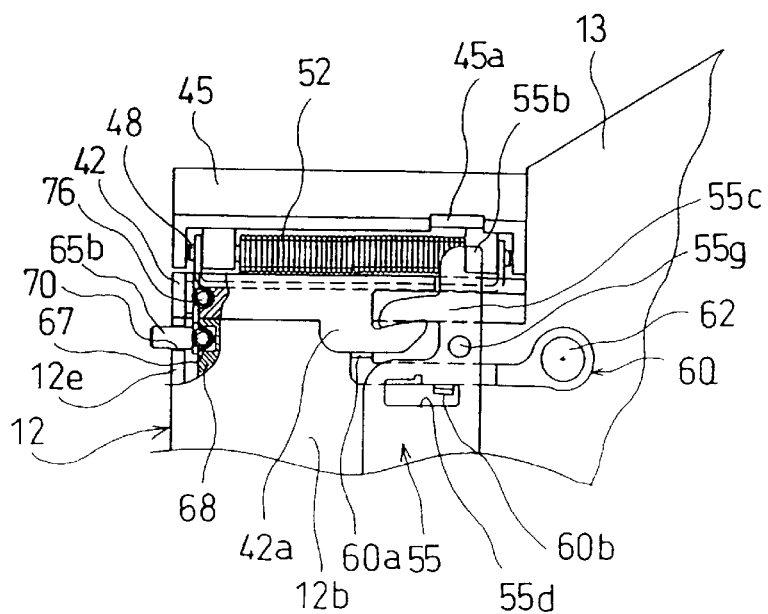
FIG. 14 is a rear view of the fundamental portion shown in FIG. 7, a part of which being shown as a cut-away view to show the holding mechanism shown in FIGS. 12 and 13.
Figure 15:
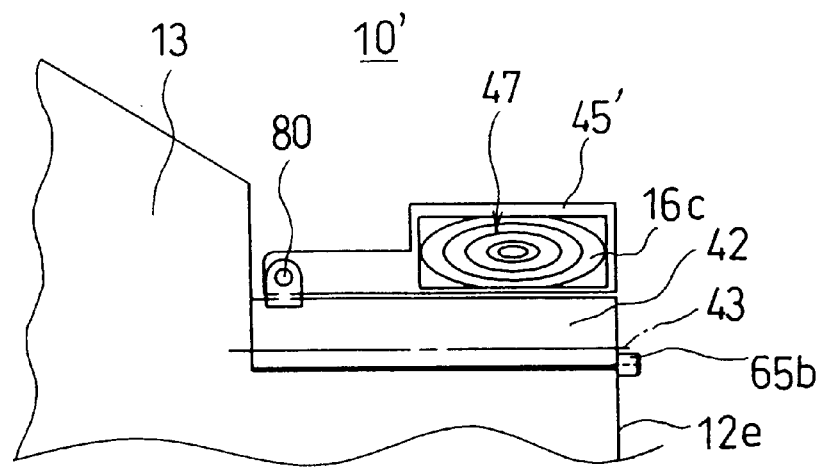
FIG. 15 is a front view of a fundamental portion of a second embodiment of an SLR camera to which the present invention is applied, showing the retractable flash in its retracted position.

FIGS. 12 through 14 show an embodiment of the second mechanism. Due to this second mechanism the casing 45 is held in its retracted position against the biasing force of the torsion coil spring 52 fitted on the shaft 48. There is provided a first slidable plate 65 positioned along the inner surface of the left-side wall 12e at an upper portion thereof to be guided in the front/rear direction of the camera 10 (horizontal direction as viewed in FIG. 12 or 13) within a predetermined shifting range. The first slidable plate 65 is provided with a pair of slots 65a, a pin 65b and a projection 65c. The pair of slots 65a extend in the front/rear direction of the camera 10. The pin 65b is formed on the first slidable plate 65 between the pair of slots 65a and extends in a direction normal to the first slidable plate 65 to fit in a slot 70 formed on the left-side wall 12e of the camera body 12 (see FIG. 4). The projection 65c projects upwardly towards the film door 42. Two guiding pins 66 which are protruded from the inner surface of the left-side wall 12e are respectively fitted in the pair of slots 65a so that the first slidable plate 65 can shift in the front/rear direction of the camera 10 within a certain shifting range predetermined by the length of each slot 65a. The first slidable plate 65 is continuously biased towards the front of the camera 10 (to the left as viewed in FIG. 12 or 13) by a compression spring 67 which is supported by a fixed member 68 (see FIG. 14) secured to the inner surface of the left-side wall 12e. The compression spring 67 is positioned between the rear end of the first slidable plate 65 and a rear part of the fixed member 68. The first slidable plate 65 can be manually shifted in the front/rear direction of the camera 10 by manually shifting the pin 65b with fingers or the like.

There is provided a second slidable plate 72 positioned inside the film door 42 above the first slidable plate 65. The second slidable plate 72 is provided with a pair of slots 72a and a projection 72b. The pair of slots 72a extend in the front/rear direction of the camera 10 on condition that the flash 16 is in its retracted position. The projection 72b projects downwardly, towards the first slidable plate 65. The second slidable plate 72 is further provided at the front end thereof with an engaging portion 72c (projection) which extends obliquely towards the front (in the left direction of FIG. 12 or 13) of the camera 10. Two guiding pins 74 which are protruded from the inner surface of the film door 42 are respectively fitted in the pair of slots 72a so that the second slidable plate 72 can shift in the lengthwise direction thereof within a certain shifting range predetermined by the length of each slot 72a.

The second slidable plate 72 is continuously biased towards the front of the camera 10 (to the left as viewed in FIG. 12 or 13) by a compression spring 76 which is positioned in a recess 77 formed on the inner surface of the film door 42 such that the front end of the spring 76 contacts the rear end of the second slidable plate 72 while the rear end contacts a rear end of the recess 77.

In the case where the film door 42 is closed and at the same time the flash 16 is in its retracted position, each of the first and second slidable plates 65 and 72 is continuously biased forwardly by the corresponding compression spring 67 or 76 to stay at the frontmost position (lock position) in the predetermined shifting range. In this state, the projection 72b of the second slidable plate 72 is positioned behind (or to the right as viewed in FIG. 12 or 13) the projection 65c of the first slidable plate 65 so as to form a slight gap between the two projections 65c and 72b. Furthermore, the engaging portion 72c, formed at the front end of the second slidable plate 72, is positioned in a recess 45b formed on a left-side wall 45c of the casing 45 to hold the casing 45 (flash 16) in the retracted position. The recess 45b is formed to have a shape similar to the shape of the engaging portion 72c so that the engaging portion 72c is disengaged from the recess 45b when the second slidable plate 72 shifts rearwardly by a predetermined distance from the position thereof shown in FIG. 12. The first and second slidable plates 65 and 72, the compression springs 67 and 76, the recess 45b, etc., together constitute the aforementioned second mechanism.

The operation of the second mechanism will be hereinafter discussed. In the state shown in FIG. 12, when the pin 65b is manually shifted rearwardly (to the right as viewed in FIG. 12), the first slidable plate 65 shifts in the same direction, so that the projection 65c first contacts the projection 72b and subsequently shifts the same rearwardly to thereby move the second slidable plate 72 in the same direction. Hence, rearward movement of the second slidable plate 72, the engaging portion 72c of the second slidable plate 72 is disengaged from the recess 45b, so that the casing 45 automatically rotates in a clockwise direction as viewed in FIG. 13 (i.e., the casing 45 pops-up) by the biasing force of the torsion coil spring 52 to thereby position the flash 16 in its operable position.

According to the structure of the second mechanism, when the film door 42 is open, the second slidable plate 72 will not shift even if the pin 65b is operated because the projection 72b is disengaged from the projection 65c. This effectively prevents the flash 16 from popping-up when the film door 42 is open. If the flash 16 pops-up when the film door 42 is open, i.e., if the casing 45 moves from the retracted position to the operable position thereof when the film door 42 is open, the chances of damaging the flash 16 would increase because the flash 16 would be in a state as if hanging from the film door 42. However, such a problem will never occur due to the second mechanism because the flash 16 is prevented from popping-up when the film door 42 is open.

As can be understood from the foregoing, according to the first embodiment of the SLR camera 10, the camera 10 is provided with the flash 16 in a space-efficient manner. Specifically, the camera 10 is provided on the film door 42 thereof with the flash 16, the arrangement of which contributes much to downsizing the camera 10. Moreover, according to the first embodiment of the SLR camera 10, in the state where the flash 16 is in its retracted position, the heights of the right and left sides of the camera body 12 are substantially the same as can be seen from FIG. 2, which contributes a good proportional appearance of the camera 10. Furthermore, owing to the first and second mechanisms provided in the camera 10, the chances of mistakenly damaging the flash 16 or the casing 45 will be greatly reduced.

FIGS. 15 through 21 show a second embodiment of an SLR camera 10' to which the present invention is applied. This SLR camera 10' is identical to the first embodiment of the SLR camera 10 except for the shape of the casing of the flash 16 and also the way of pivoting the casing on the film door 42. Therefore only the elements or parts different from those in the first embodiment will be hereinafter discussed.

The main difference between the first embodiment of the camera 10 and the second embodiment of the camera 10' is how the flash casing is pivoted on the film door 42. Namely, in the first embodiment of the camera 10 the casing 45 is pivoted about the shaft 48 which extends parallel to the shaft 43, whereas in the second embodiment of the camera 10' the casing 45' is pivoted about a shaft 80 which is fixed to the film door 42 to extend in the front/rear direction of the camera 10', namely, in a direction perpendicular to the shaft 43.

Similarly to the casing 45 of the camera 10, the dimensions of the casing 45' are such that it precisely fits and covers the upper surface of the film door 42 when the casing 45' is in its retracted position, so that the upper surface of the casing 45' forms a part of the upper exterior wall of the camera 10'. The flashlight emitting portion 47 is arranged in a left portion (right portion as viewed in FIG. 15) of the casing 45' at the front thereof, as can be seen from FIGS. 15 and 17. Accordingly, the casing 45' has a bulged portion under which the flashlight emitting portion 47 is positioned, as can be seen from each of FIGS. 15,16 and 17. Therefore, there is a stepped portion on the upper surface of the casing 45'.

Figure 16:
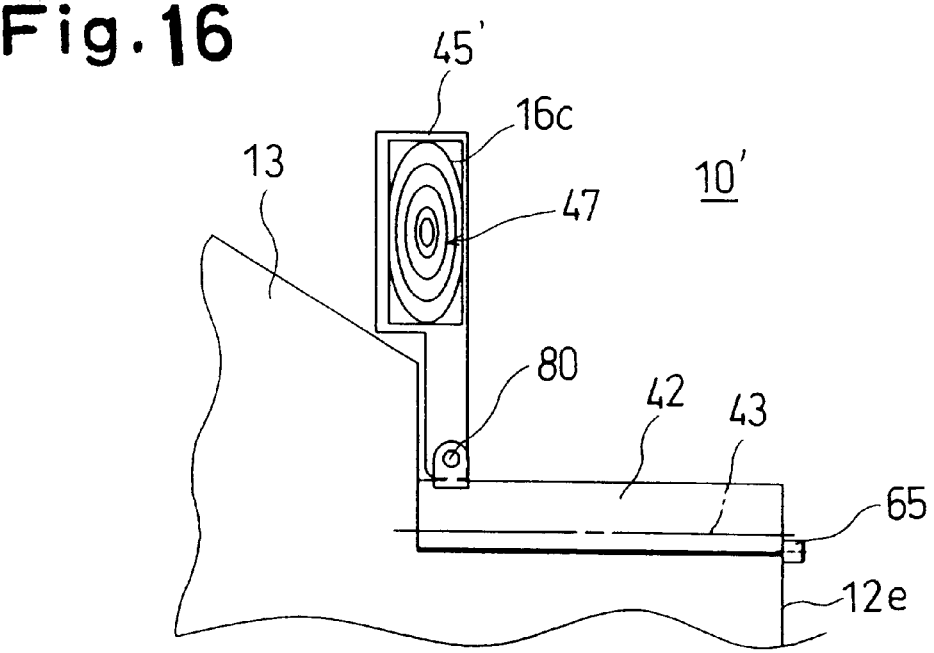
FIG. 16 is a front view of the fundamental portion shown in FIG. 15, showing the retractable flash in its operable position.
Figure 17:
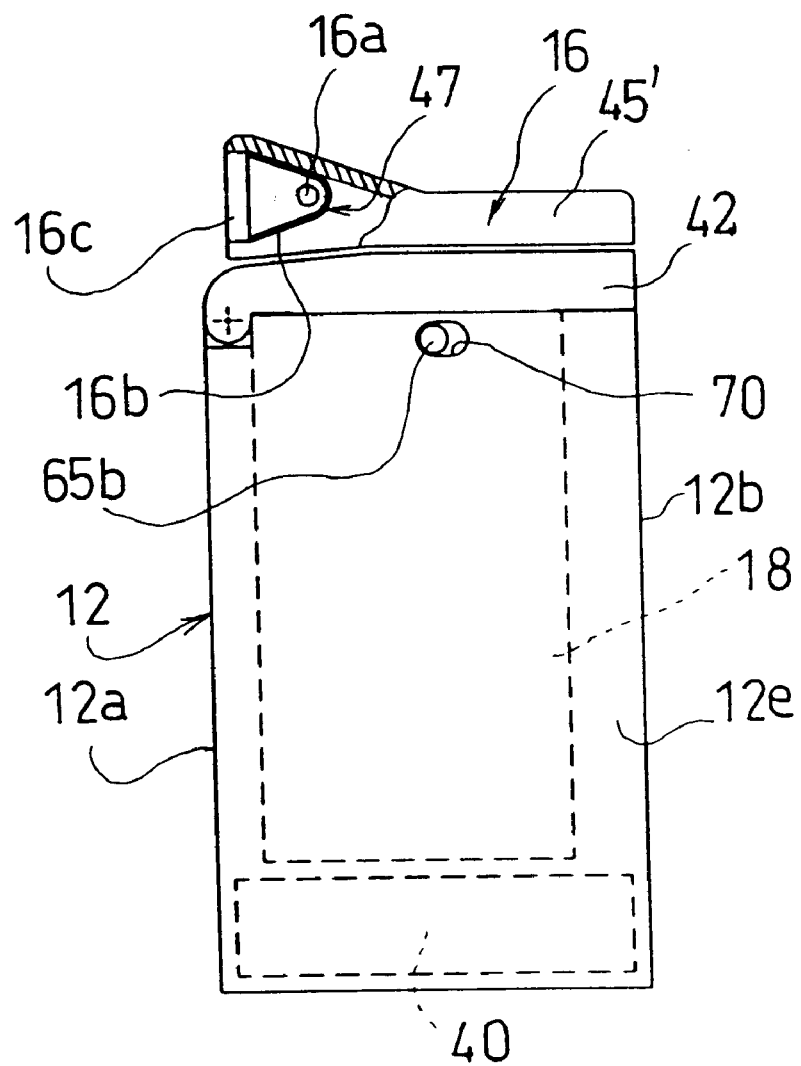
FIG. 17 is a side view of the fundamental portion shown in FIG. 15.
Figure 18:
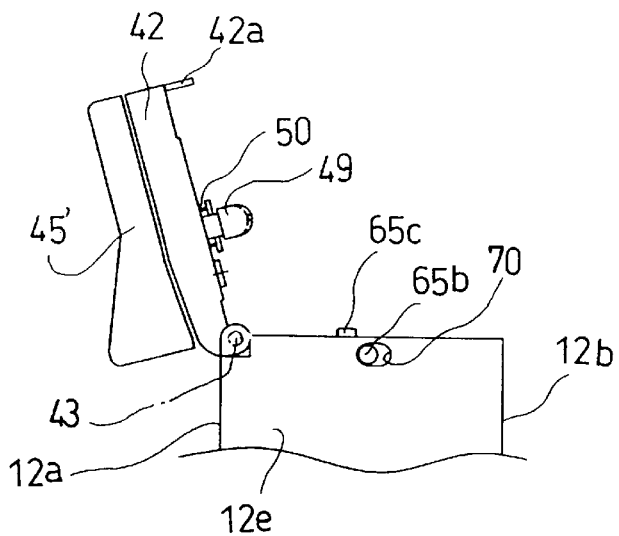
FIG. 18 is a side view of the fundamental portion shown in FIG. 17, showing the film door in a widely opened state while the retractable flash is in its retracted position.
Figure 19:
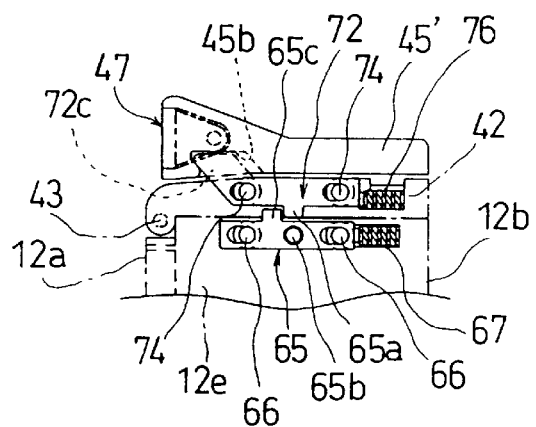
FIG. 19 is a side view of a mechanism for holding the retractable flash in its retracted position in the second embodiment of the camera, showing the retractable flash in its retracted position.
Figure 20:
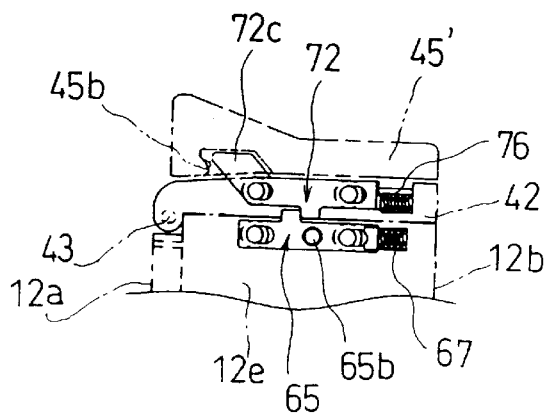
FIG. 20 is a side view of the holding mechanism shown in FIG. 19 in a different state.
Figure 21:
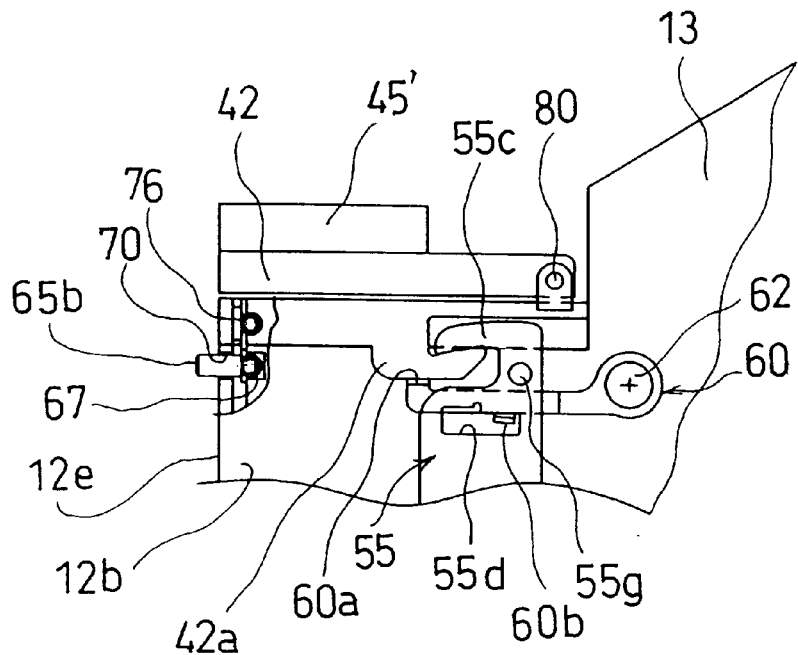
FIG. 21 is a rear view of the fundamental portion shown in FIG. 16, a part of which being shown as a cut-away view to show the holding mechanism shown in FIG. 19.
Figure 22:
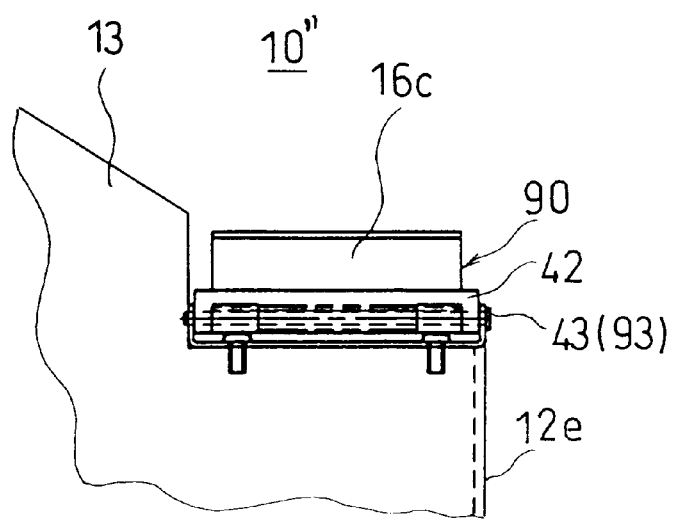
FIG. 22 is a front view of a fundamental portion of a third embodiment of an SLR camera, showing that the retractable flash is retracted.
Figure 23:
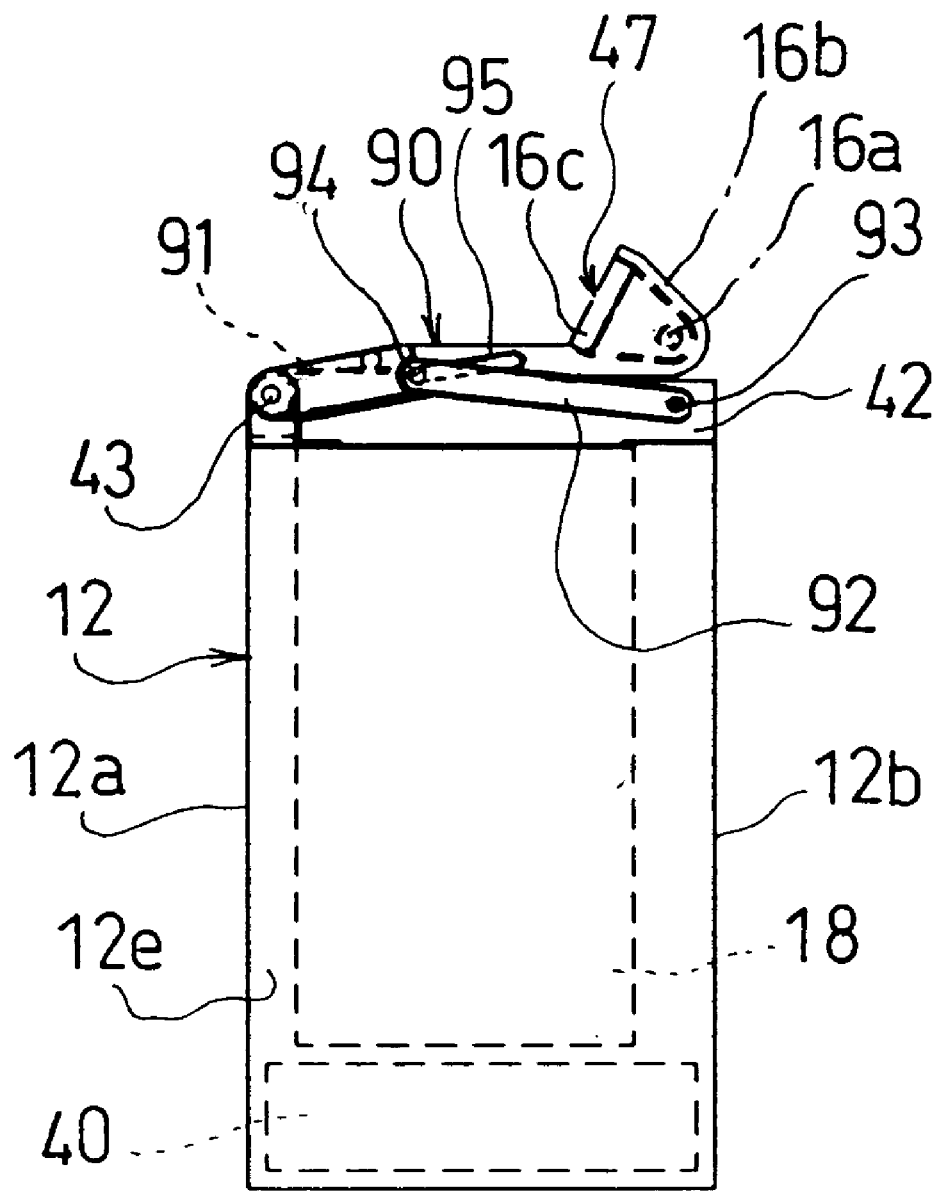
FIG. 23 is a side view of the fundamental portion shown in FIG. 22, showing the film door in its closed position while the retractable flash is retracted.
Figure 24:
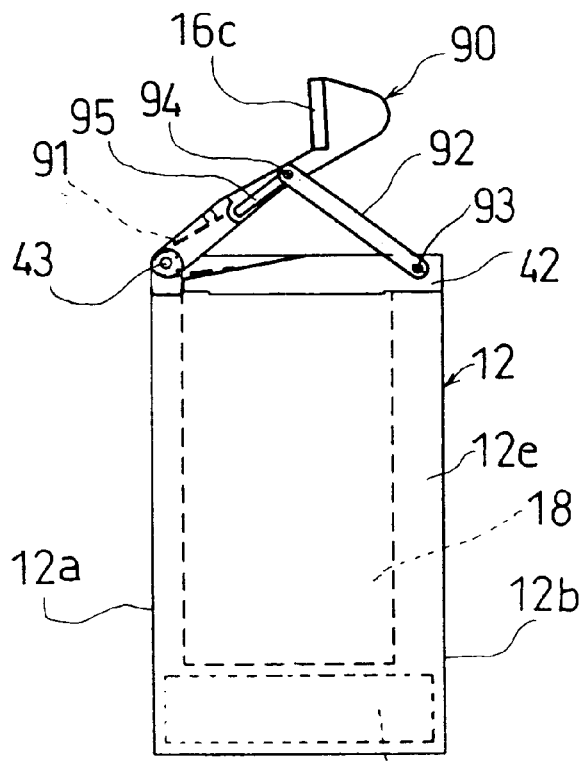
FIG. 24 is a side view of the fundamental portion shown in FIG. 23, showing the film door in its closed position while the retractable flash is in its operable position.

The shaft 80, about which the casing 45' is pivoted, is positioned in the vicinity of the roof portion 13 of the camera body 12 to extend in the front/rear direction of the camera 10'. Therefore, the flash 16 can be positioned in its operable position by rotating the casing 45' in a counterclockwise direction as viewed in FIG. 15. FIG. 16 shows the state where the flash 16 is in its operable position. Effects similar to those of the first embodiment can be expected in the second embodiment of the camera 10'.

FIGS. 22 through 26 show a third embodiment of an SLR camera 10" to which the present invention is applied. This SLR camera 10" is identical to the first embodiment of the SLR camera 10 in many respects. Therefore only the members or elements different from those of the first embodiment will be hereinafter discussed.

In the third embodiment of the camera 10", a rotatable member 90 is pivoted about the shaft 43, about which the film door 42 is also pivoted. Namely, in the third embodiment of the camera 10", the film door 42 and the rotatable member 90 are pivoted about a common shaft, namely the shaft 43.

The rotatable member 90 is positioned on the film door 42. The rotatable member 90 is provided at a free end thereof with the flashlight emitting portion 47 which generally bulges upwards from the free end. The rotatable member 90 can rotate about the shaft 43 between its retracted position shown in FIG. 23 and its operable position shown in FIG. 24. The rotatable member 90 is continuously biased towards the operable position, namely, in the counterclockwise direction as viewed in FIG. 23 or 24 by a torsion coil spring 91 fitted on the shaft 43.

The film door 42 and the rotatable member 90 are linked with each other through a supporting stick 92. One end of the stick 92 is pivoted about a pivot 93 secured to the rear end of the film door 42. The other end of the stick 92 is provided with a pin 94 which is slidably fitted in a groove 95 formed on the rotatable member 90 in a middle part thereof. The pin 94 is positioned at one end (one of the two ends which is closer to the shaft 43) of the groove 95 when the rotatable member 90 is in its retracted position shown in FIG. 23, while the pin 94 is positioned at the other end (which is farther from the shaft 43) of the groove 95 when the rotatable member 90 (flash 16) is in its operable position shown in FIG. 24. Accordingly, the operable position of the rotatable member 90 (flash 16) is determined by the position of the other end of the groove 95 on the rotatable member 90.

Figure 25:
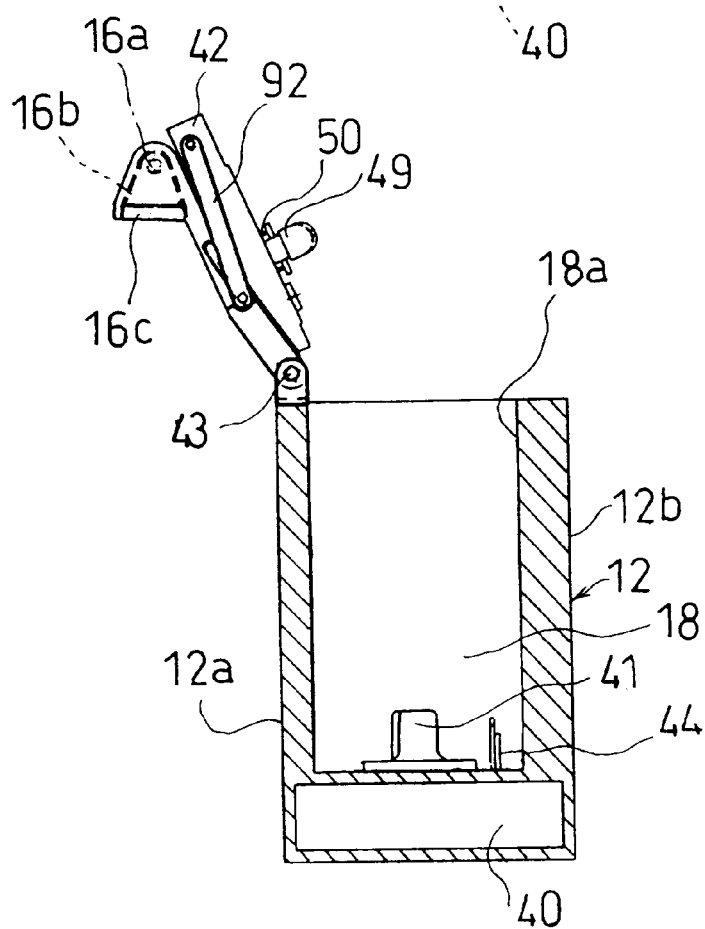
FIG. 25 is a cross sectional view of the fundamental portion shown in FIG. 23, showing the film door in a widely opened state while the retractable flash is retracted.
Figure 26:
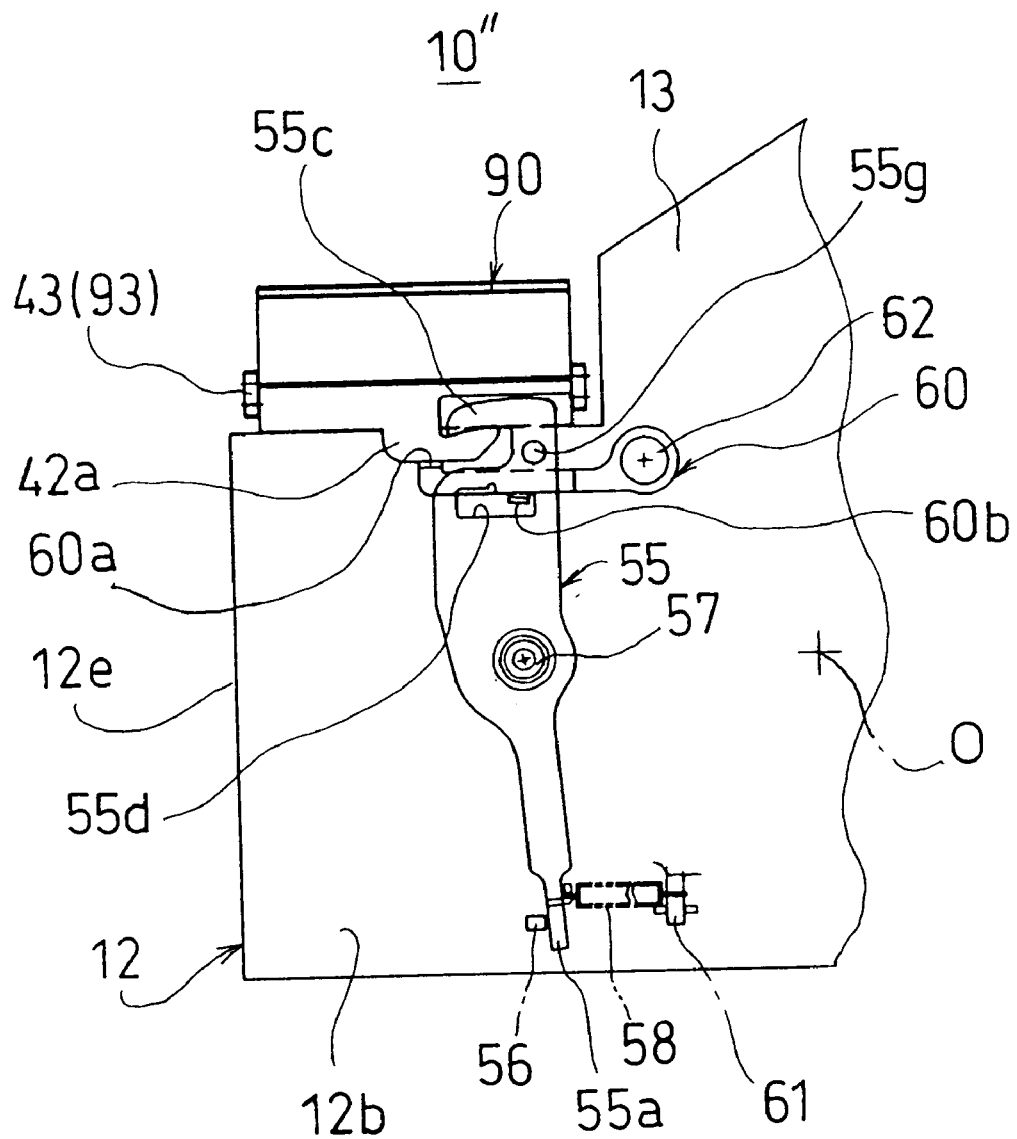
FIG. 26 is a rear view of the fundamental portion shown in FIG. 22.

When the rotatable member 90 is in its retracted position, an engaging claw (not shown) formed on the rotatable member 90 is engaged with a corresponding engaging claw (not shown) formed on the film door 42 to thereby hold the rotatable member 90 is in its retracted position. When the user desires to set the flash 16 operable, he or she has only to lift the rotatable member 90 slightly using fingers or the like, which makes the aforementioned two engaging claws (not shown) disengage from each other, thereby the rotatable member 90 automatically lifts to its operable position by the biasing force of the torsion coil spring 91. FIG. 25 shows a state of the camera 10" where the film door 42 is widely open with the flash 16 in its retracted position. FIG. 26 shows a rear view of the third embodiment of FIG. 22. As shown in FIG. 26, in the third embodiment, the structure and operation of the first mechanism (excepting the protrusion 55b of the first embodiment) are substantially as previously described. Accordingly, the description thereof is omitted. In the camera 10", the first lever 55 does not have the protrusion 55b at the upper end of the first lever 55 as in camera 10 and camera 10'.

Furthermore, in the third embodiment of the camera 10", a mechanism which corresponds to the second mechanism provided in each of the first and second embodiments of the cameras 10 and 10' is not provided. In other words, the third embodiment of the camera 10" does not have any members corresponding to the following: a first slidable plate 65, a second slidable plate 72, compression springs 67 and 76. Effects similar to those of the first embodiment can be expected in the third embodiment of the camera 10".

Although the third embodiment of the camera 10" does not have a mechanism corresponding to the second mechanism provided in each of the first and second embodiments, it is of course possible to provide the third embodiment of the camera 10" with a mechanism similar to the second mechanism.

The arrangement of the batteries 30 and 31 is not limited solely to the specific arrangement shown in FIG. 3, any other arrangement may be adopted. The number of batteries used is not limited to two but may be one or more than two.

Similarly, the arrangement of the condensers 24 and 25 is not limited solely to the specific arrangement shown in FIG. 3, any other arrangement may be adopted. The number of condensers used is not limited to two but may be one or more than two.

The film cassette used is not limited solely to the Advanced Photo System film cassette, any other film cassette may be adopted, as long as the film cassette used for the camera 10, 10' or 10" is of a drop-in loading type.

Each of the first, second and third embodiments is an SLR camera. However, the present invention can be applied not only to an SLR camera but also a lens-shutter type camera.

obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera comprising:
a film chamber, formed in a camera body, for accommodating a film cassette therein;
a film door for opening and closing an opening formed on said camera body through which said film cassette is inserted into said film chamber, said film door being positioned at an upper part of said camera; and
a flash provided on said film door.

2. The camera according to claim 1, wherein said film door is pivoted about a shaft fixed to said camera body.

3. The camera according to claim 2, wherein said shaft is fixed to a front part of said camera body to extend in a widthwise direction of said camera body.

4. The camera according to claim 1, wherein said film cassette is of a drop-in loading type.

5. The camera according to claim 4, wherein said film cassette is IX240 type film cassette.

6. The camera according to claim 1, wherein said flash comprises a casing and a flashlight emitter supported by said casing, wherein said casing is movable relative to said film door so as to move said flashlight emitter in a direction apart from said film door.

7. The camera according to claim 6, wherein said casing is pivoted about a shaft fixed to said film door.

8. The camera according to claim 7, wherein said shaft is fixed to a rear part of said film door to extend in a widthwise direction of said camera body.

9. The camera according to claim 3, wherein said flash comprises a casing and a flashlight emitter supported by said casing, wherein said casing is pivoted about a second shaft fixed to said film door, and
wherein said second shaft is fixed to a rear part of said film door to extend in said widthwise direction of said camera body.

10. The camera according to claim 9, wherein said shaft is positioned in front of said opening while said second shaft is positioned behind said opening.

11. The camera according to claim 2, wherein said flash comprises a casing and a flashlight emitter supported by said casing, wherein said casing is pivoted about said shaft.

12. The camera according to claim 2, wherein said flash comprises a casing and a flashlight emitter supported by said casing, wherein said casing is pivoted about a second shaft fixed to said film door, wherein said second shaft extends perpendicular to said shaft.

13. The camera according to claim 6, wherein said casing is movable between a retracted position where said flashlight emitter is located at a first position close to said film door and an operable position where said flashlight emitter is located at a second position above said first position, and wherein said camera further comprises a mechanism for preventing said film door from opening when said casing is in said operable position.

14. The camera according to claim 6, wherein said casing is movable between a retracted position where said flashlight emitter is located at a first position close to said film door and an operable position where said flashlight emitter is located at a second position above said first position, and wherein said camera further comprises a mechanism for preventing said casing from moving from said retracted position to said operable position when said film door is open.

15. A camera comprising:

a film door for opening and closing an opening formed on a camera body through which a film cassette is inserted into a film chamber of said camera, said film door being positioned on an upper part of said camera;

a pop-up type flash provided on said film door; and a mechanism for preventing said flash from popping-up when said film door is open.

16. The camera according to claim 15, wherein said camera further comprises a second mechanism for preventing said film door from opening when said flash is in a popped-up position.

17. A camera comprising:

a film chamber having an opening at an upper end of said film chamber, a film cassette being inserted into said film chamber through said opening;

a film door for opening and closing said upper opening of said film chamber, said film door being positioned at an upper part of said camera; and a flash provided on said film door.

18. The camera according to claim 17, wherein said flash is a pop-up type flash.

19. The camera according to claim 18, further comprising a first mechanism for preventing said flash from popping-up when said film door is open.

20. The camera according to claim 19, further comprising a second mechanism for preventing said film door from opening when said flash is in a popped-up position.

* * * * *